Patented June 5, 1951

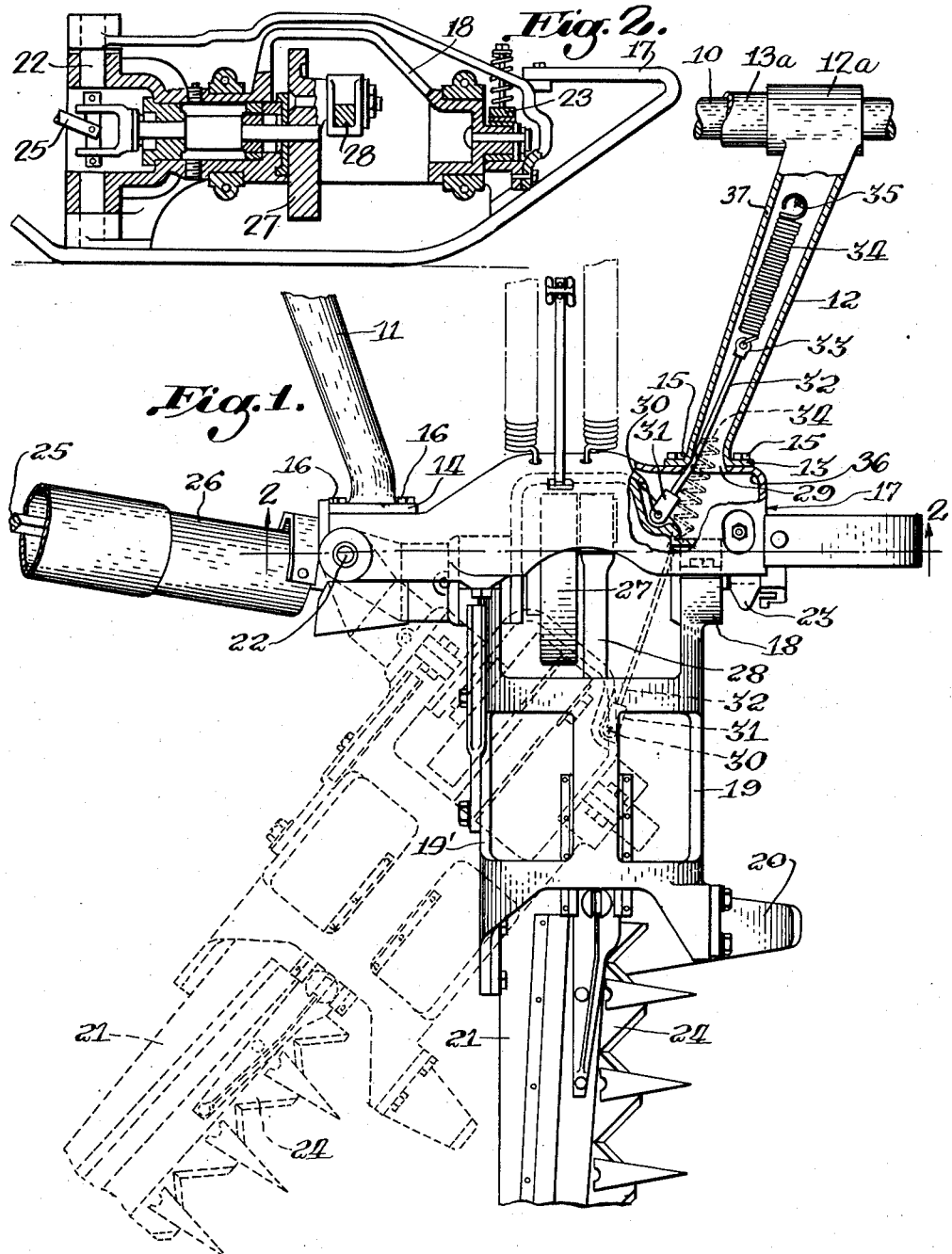

2,555,541

UNITED STATES PATENT OFFICE 2,555,541

CONTROL MEANS FOR MOWER CUTTER BARS

Samuel E. Hilblom, Chicago, Ill., assignor to International Harvester Company, a corporation of New Jersey Application August 16, 1947, Serial No. 769,038

5 Claims. (Cl. 56—264)

This invention relates to a mower and more particularly to a control means for the cutter bar thereof.

The invention is particularly adaptable to that type of mower comprising a supporting frame to which a cutter bar is connected for rearward swinging movement from normal operating position upon the striking of an obstruction and for return movement forwardly to operative position. This type of mower construction is adapted particularly to mounting on a tractor or like vehicle. In such instance the cutter bar may be carried at a point just forwardly of the right-hand rear wheel of the tractor, in such position that the cutter bar, when caused to swing rearwardly upon the striking of an obstruction, may engage or pass under the tractor rear wheel. Such result is not altogether desirable unless the cutter bar is especially constructed to withstand the weight of the tractor driven thereover. Moreover, reconnection of the cutter bar to normal position is rendered somewhat difficult by the requirement that the cutter bar be held while the tractor wheel is backed over it. The same general characteristics are present in cases where a releasable cutter bar is used on a mower having a rear caster wheel or the like which may have a tendency to roll over the released cutter bar.

It is a principal object of the present invention to provide a control means for limiting rearward swinging of the cutter bar when released. Other objects of the invention are to provide: a control means that may be readily adapted to mowers of certain existing types; a control means including a cable or similar flexible element connected between the releasable cutter bar and the supporting structure therefor; a construction in which the flexible element is contained or housed within a structural part of the supporting frame; means for maintaining tension on the flexible element so that the element is returned to its normal position along with return of the cutter bar to operative position; and a construction that is simple and inexpensive in design and is not likely to require adjustment or maintenance during operation thereof.

The foregoing and other desirable objects and important features of the invention will become apparent as the disclosure is more fully made in the following detailed description of a preferred embodiment of the invention as shown in the accompanying sheet of drawings, in which the Figure 1 is a fragmentary plan elevation of a portion of a mower frame or supporting structure and the inner end of cutting mechanism attached thereto, the view illustrating in broken lines the released or rearward position of the cutter bar. Figure 2 is a cross sectional view taken substantially along line 2—2 of Figure 1.

Although the invention is shown and will be described in connection with a particular type of tractor-mounted mower, it should be understood that the principles of the invention have wider application and may be adapted to mowers and harvesters of other types.

The particular type of mower construction illustrated is adapted for use in connection with a tractor-mounted mower of the type wherein the tractor has a longitudinally extending support on which is carried frame structure including laterally outwardly extending frame members, to the outer ends of which is connected means for carrying the cutter bar.

In the present case the longitudinal support is indicated by the numeral 10 and the laterally outwardly extending frame structure is shown as comprising a pair of elongated frame members 11 and 12, at least the latter of which is interiorly recessed or of tubular construction and provided at its outer end with an attaching flange 13. Each member 11 and 12 may comprise a hub 12a at its inner end connected to a tube 13a pivotally mounted on support 10. The member 11 is provided with a similar attaching flange 14. The flanges 13 and 14 are rigidly secured, as by cap screws 15 and 16, to the inner wall structure of an inner shoe or runner construction designated generally by the numeral 17. The shoe or runner construction provides a support or mounting member for connection with a second member 18. The member 18 includes a pair of laterally outwardly extending frame members 19, 19', the outer ends of which are preferably formed integral with a second runner 20, to which is rigidly connected the inner end of an outwardly extending cutter bar 21. The connection of the member 18 to the inner shoe or runner 17 is made by a pivot pin 22 disposed on a vertical axis at the proximate rear ends of the members, and the forward ends of the members are connected by means including a releasable latch mechanism designated generally by the numeral 23 and as more specifically shown in my copending application now U. S. Patent 2,513,938 which is a continuation in part of a copending application Serial No. 553,581, filed September 4, 1944, and now abandoned. Any other suitable form of construction may be provided, by means of which the cutter bar is pivotally connected on a vertical axis to a supporting frame for rearward swinging movement about such axis when the cutter bar strikes an obstruction. Constructions of this type are well-known and have for their purpose the prevention of damage to the cutting mechanism.

In the present construction shown as background for the invention herein disclosed, there is provided driving means for a sickle or knife 24 carried by the cutter bar. This driving means includes a shaft 25 contained in a tubular shield 26 for driving a flywheel 27, which in turn drives a pitman 28 that is connected to reciprocate the knife 24 as shown in said Patent 2,513,938.

The inner wall 36 of the inner shoe structure 17 is provided with an opening 29 alined with the hollow or recessed interior of the supporting or housing member 12. A forward portion of the cutter-bar-carrying member 18 includes a pin 30, to which is connected a clevis 31 carried at the outer end of a flexible element in the form of a cable 32. The cable extends inwardly and through the opening 29 and within the tubular member 12. The inner end of the cable has fixed thereto an eye 33, to which is connected one end of a resilient or yieldable means in the form of a coiled tension spring 34. The other end of the spring is connected to a pin 35 fixed to an inner end portion 37 of the member 12. In effect, the cable 32 and spring 34 constitute an elongatable element which is flexible.

In the operation of the construction illustrated and described, the cutter bar 21 normally extends laterally outwardly or grasswardly in its operative position, being maintained in that position by means of the releasable latch 23. When the cutter bar strikes an obstruction of sufficient magnitude to release the latch 23, it swings rearwardly about the axis of the vertical pivot 22, approximately to the position shown in broken lines. Rearward swinging of the cutter bar is controlled or limited by elongation of the means or element comprising the cable 32 and spring 34. It will be understood, of course, that the operator of the tractor or other vehicle used for propelling the mower will stop operation thereof as soon as he realizes that the cutter bar has encountered the obstruction and has been swung rearwardly. In the usual case the tractor is backed so that the cutter bar may be restored to normal operating position. In some instances the outer end of the cutter bar includes a sprag or similar device for engaging the ground to hold the cutter bar while the tractor is backed. In other cases the cutter bar must be restored manually to operative position. In either event return movement of the cutter bar from the broken line position to the full line position will in turn restore the cable 32 and spring 34 to their original positions. It is preferable that the spring 34 be only sufficiently strong to maintain tension on the cable 32, so that the cable will remain taut during restoration of the cutter bar to its normal position; although the spring may be made sufficiently strong, if desired, to tend to exert through the cable 32 a force sufficient to swing the cutter bar forwardly.

It will be noted that the spring and cable are housed or contained within the housing or tubular member 12 and are thus not exposed to the crop being harvested. Consequently the parts, even as simple as they are, cannot become entangled with the crops and are thus not likely to get out of order. The housing of the cable and spring 34 within the tubular member eliminates the necessity of providing a separate shield therefor.

Other features of the invention will undoubtedly occur to those skilled in the art, as will likewise several modifications in the construction illustrated. It is, therefore, not desired to limit the invention to the precise details disclosed.

What is claimed is:

1. For a mower including a supporting frame, a cutter bar, and means pivotally connecting the cutter bar and frame and providing for horizontal rearward swinging of the cutter bar from an operative position upon the striking of an obstruction and for return movement forwardly to operative position, that improvement comprising: means providing a generally tubular member on the supporting frame; means providing an opening in the means that connects the cutter bar to the frame, said opening being alined with the tubular member; and means for limiting rearward swinging of the cutter bar, including a flexible elongatable element connected to the cutter bar, passing through said opening and entering and being connected to the tubular member.

2. For a mower including a supporting frame, a cutter bar, and means pivotally connecting the cutter bar and frame and providing for horizontal rearward swinging of the cutter bar from an operative position upon the striking of an obstruction and for return movement forwardly to operative position, that improvement comprising: means providing a housing member on the supporting frame; means providing an opening in the means that connects the cutter bar to the frame; and means for limiting rearward swinging of the cutter bar, including a flexible elongatable element connected to the cutter bar, passing through said opening and entering and being connected to the housing member.

3. For a mower having a supporting frame and a cutter bar extending normally outwardly in operative position therefrom, that improvement comprising: means including a tubular member connected at its inner end portion to the supporting frame and extending outwardly therefrom toward the cutter bar; a support connected to the outer end portion of said tubular member and having an opening communicating to the interior of the tubular member; a cutter-bar-carrying member fixed to the inner end portion of the cutter bar in proximity to the support; means hinging said cutter bar member to the support for horizontal rearward swinging of the member and cutter bar from operative position upon the striking of an obstruction and for return movement thereof forwardly to operative position; a cable or the like connected at one end portion to the cutter bar member, passing through the opening in the support and having its other end portion disposed within the tubular member; and means including a resilient element connecting said other end portion of the cable to the tubular member.

4. For a mower having a supporting frame and a cutter bar extending normally outwardly in operative position therefrom, that improvement comprising: means including an interiorly recessed member connected to the supporting frame and extending toward the cutter bar;

means including a support on said member having an opening communicating to the interior of the member; a cutter-bar-carrying member fixed to the inner end portion of the cutter bar in proximity to the support; means hinging said cutter bar member to the support for horizontal rearward swinging of the member and cutter bar from operative position upon the striking of an obstruction and for return movement thereof forwardly to operative position; a flexible element connected at one end portion to the cutter bar member, passing through the opening in the support and having its other end portion contained within the interiorly recessed member; and means including a resilient element connecting said other end portion of the flexible element to the tubular member.

5. The combination with a support frame having a hollow laterally extending member, a cutter bar pivoted on a generally vertical axis to the frame at a point rearwardly of said member for susbtantially horizontal rearward movement from an operative position upon striking an obstruction and for return movement forwardly to operative position, and means for limiting said rearward movement of the cutter bar and comprising flexible resilient means loosely fitted within said member and anchored thereto and extending from the outer end of the member and anchored to said cutter bar at a point adjacent thereto and disposed forwardly and inboardly of said axis, said point being located in the operative position of the cutter bar rearwardly of said outer end of said member.

SAMUEL E. HILBLOM.

REFERENCES CITED

The following references are of record in the file of this patent:

UNITED STATES PATENTS

| Number | Name | Date |
|---|---|---|
| 546,200 | Staude | Sept. 10, 1895 |
| 2,198,910 | Everett | Apr. 30, 1940 |
| 2,204,333 | Wagner | June 11, 1940 |

FOREIGN PATENTS

| Number | Country | Date |
|---|---|---|
| 440,651 | Great Britain | Dec. 30, 1935 |